United States Patent Office 3,027,381
Patented Mar. 27, 1962

3,027,381
CERTAIN 1,2,5 THIADIAZOLE-3-HYDRAZIDES
James M. Sprague, Gwynedd Valley, and Edward J. Cragoe, Jr., Lansdale, Pa., assignors to Merck & Co., Inc., Rahway, N.J., a corporation of New Jersey
No Drawing. Filed Dec. 4, 1959, Ser. No. 857,262
12 Claims. (Cl. 260—302)

This invention is concerned with 1,2,5-thiadiazole compounds and in particular with 1,2,5-thiadiazole compounds having attached to the carbon atom in the 3-position a hydrazinocarbonyl radical, the hydrazine moiety of which has at least one substituent attached to the 2-position nitrogen.

The compounds of this invention are 1-(1,2,5-thiadiazole-3-carbonyl)—2—$R^1$—2—$R^2$-hydrazines wherein $R^1$ can be a straight or branched chain alkyl radical, a cycloalkyl or an azacycloalkyl; the straight or branched chain alkyl radicals advantageously contain from 1 to 12 carbon atoms, the cycloalkyl 3–6 carbon atoms and the azacycloalkyl radicals from 5 to 7 carbons in the nuclear structure.

The straight or branched chain alkyl group represented by $R^1$ can be either a hydrocarbon radical or one or more of the hydrogens can be replaced by, for example, (1) an N-substituted carbamoyl radical, particularly and N-phenylcarbamoyl or an N-phenalkylcarbamoyl radical wherein the phenyl moiety can be either unsubstituted or one or more of its hydrogens can be replaced by lower alkyl, lower alkoxy, halogen and halogen-like radicals, and the alkyl moiety preferably is a straight or branched chain lower alkyl, or (2) an amino radical, especially a tertiary-amino radical, and particularly a di-lower-alkylamino or polymethyleneamino, i. e. a dialkylamino wherein the alkyl groups are linked together to form a heterocyclic ring with the amino-nitrogen to which they are attached, or (3) the alkyl group can have, as a substituent group, an alkoxy, alkylmercapto, aryloxy, arylmercapto, aralkoxy, or an aralkylmercapto, wherein the alkyl moieties are straight or branched chain having, preferably, from 1 to 6 carbons, and the aryl moieties preferably are either unsubstituted phenyl or a mono- or poly-substituted phenyl, the substituents being selected from halogen or halogen-like radicals as chlorine, bromine, fluorine, iodine, trifluoromethyl, or a lower-alkyl or a lower-alkoxy group.

The cycloalkyl radical represented by $R^1$ also can be a hydrocarbon or a hydrogen of the cycloalkyl can be replaced by a straight or branched chain lower alkyl or aryl especially a phenyl group. Similarly, the azacycloalkyl radical can be either unsubstituted radical or a hydrogen can be replaced by a straight or branched chain lower alkyl preferably attached to the nitrogen atom of the azacycloalkyl radical. The azacycloalkyl radical is attached through one of its carbon atoms to the hydrazine nitrogen.

$R^1$ also can represent an arylalkyl radical which can be either a hydrocarbon radical or the aryl moiety, preferably the phenyl moiety, can be further substituted by the replacement of one or more of its hydrogens by halogen, for example by a chlorine, bromine, fluorine, iodine, trifluoromethyl or other halogen-like radical or by lower alkoxy, such as methoxy and the like, or by one or more alkyl radicals preferably a lower alkyl radical such as the methyl, ethyl and the like radicals. In addition, the alkyl moiety of the arylalkyl group represented by $R^1$ preferably is a straight or branched chain hydrocarbon and especially a hydrocarbon radical containing from one to five carbon atoms, or an alicyclic hydrocarbon radical, advantageously an alicyclic radical containing a 3 to 6 carbon nucleus and especially one having a 3 carbon nucleus. The variable radical $R^2$ can be hydrogen, a lower alkyl, preferably a straight or branched chain hydrocarbon and particularly one having from one to five carbon atoms, a benzyl or a benzyl radical having attached to the phenyl moiety one or more of the substituents which have been described for attachement to the phenyl moiety of the arylalkyl radical represented by $R^1$.

The invention also embraces acid addition salts and/or alkali metal salts of the foregoing compounds which can be prepared by methods known to organic chemists. As many of the compounds of this invention possess amphoteric properties, salts of these compounds can be formed either with bases, such as by reaction with alkali metal hydroxides and the like to form the alkali metal salts, or acid addition salts can be prepared by reaction with inorganic or organic acids such as by reaction with hydrochloric acid, hydrobromic acid, sulfuric acid, phosphoric acid, ethane sulfonic acid, methanesulfonic acid or other acids.

The novel compounds of this invention possess monoamine oxidase inhibiting properties and are therefore useful in therapy as psychic energizers, as is more fully described hereinafter in conjunction with the example describing a dosage form suitable for administering the compounds.

The novel compounds of this invention can be prepared by one of several methods. One suitable method (hereinafter referred to as method I) comprises reacting an $R^1$-hydrazine with an ester, advantageously a lower-primary alkyl ester of a 1,2,5-thiadiazole-3-carboxylic acid which gives the 1-(1,2,5-thiadiazole-3-carbonyl)-2-$R^1$-hydrazines. The reaction advantageously is carried out in an atmosphere of nitrogen and at elevated temperatures of about 100° C. or higher for several hours.

An alternative method (II) for preparing the novel compounds of this invention comprises reacting a 1-(1,2,5-thiadiazole-3-carbonyl)-2-X-hydrazine (wherein X is hydrogen or one of the radicals included in the definition of $R^1$ above) with an alkylating or an aralkylating agent such as an alkyl halide, alkyl sulfate, or arylakyl halide, which gives the products of this invention. The reaction can be carried out in the presence of a base, for example in the presence of an alkali metal alkoxide such as sodium methoxide, or in the presence of other basic materials.

A third method, particularly attractive for preparing the 1-(1,2,5-thiadiazole-3-carbonyl) - 2 - (2 - carbamoylethyl)hydrazines, comprises reacting the selected (1,2,5-thiadiazole-3-carbonyl)hydrazine with a lower alkyl ester of acrylic acid advantageously with warming to give 1-(1,2,5 - thiadiazole - 3 - carbonyl)-2-(2 - alkoxycarbonylethyl)hydrazine and, under certain conditions also the corresponding 2,2-bis-substituted product. The product obtained then is reacted, advantageously with heating, with an amine of the formula $R^3NH_2$, wherein $R^3$ is an alkyl or substituted alkyl such as a phenylalkyl of the type hereinbefore described, to yield the desired 1-(1,2,5-thiadiazole - 3 - carbonyl)-2-(2-carbamoylethyl)hydrazine and/or the corresponding bis-substituted compound. When an acrylamide is substituted for the acrylic acid ester, the carbamoylethylhydrazines are obtained directly.

When in method II (1,2,5 - thiadiazole - 3 - carbonyl)-hydrazine is employed, it is possible to favor the formation of the mono-substituted end product or to favor the formation of the di-substituted end product either by increasing or by decreasing the ratio of this material to the other reactant employed. For example, when the reactants are employed in approximately a 1:1 molar relation, generally a major proportion of the di-substituted end product and a minor proportion of the mono-substituted end product is formed. However, when a large excess of the hydrazine starting material is employed, the relative amount of monosubstituted end product is increased and the relative amount of the disubstituted product is decreased.

The (1,2,5-thiadiazole-3-carbonyl)hydrazine employed as starting material in method II described above can be prepared by reacting a lower-primary alkyl ester of a 1,2,5-thiadiazole-3-carboxylic acid with hydrazine by the method described above.

The ester of 1,2,5 - thiadiazole - 3 - carboxylic acid, the basic starting material employed in the preparation of the compounds of this invention, can be prepared from 4-nitro-2,1,3-benzothiadiazole, a known compound, by the methods described in U.S. patent application, Serial No. 750,419 filed July 23, 1958 (now Patent No. 2,980,687) by Marvin Carmack et al., and in U.S. patent application, Serial No. 857,260, filed December 4, 1959 by Marvin Carmack et al. Application 750,419 describes conversion of the 4-nitro-2,1,3-benzothiadiazole to 1,2,5-thiadiazole-3,4-dicarboxylic acid by oxidation. In general, the 4-nitro-2,1,3-benzothiadiazole is oxidized by treatment with an alkali or alkaline earth metal permanganate. Advantageously, oxidation is effected with potassium permanganate in an aqueous reaction medium at between about 40–75° C. A slight excess of permanganate provides a satisfactory oxidation, although somewhat larger quantities can be employed if desired.

One of the carboxyl groups of the thus obtained 2,1,3-thiadiazole-4,5-dicarboxylic acid then is removed advantageously by refluxing in an organic solvent, such as anisole or phenetole, or other solvents that boil at temperatures between about 140–200° C. The remaining carboxyl group then can be esterified by refluxing with ethanol containing a little concentrated sulfuric acid.

The conversion of the 2,1,3-thiadiazole-4,5-dicarboxylic acid to the monocarboxy compound and the preparation of the ester and hydrazide derivatives of the monocarboxy compound is described in detail in U.S. patent application, Serial No. 857,260, filed December 4, 1959 by Marvin Carmack et al.

The ethyl ester of 1,2,5-thiadiazole-3-carboxylic acid, employed as starting material in most of the examples of the present case, can be prepared from 4-nitro-2,1,3-benzothiadiazole in two steps, as described below.

STEP A—1,2,5-THIADIAZOLE-3,4-DICARBOXYLIC ACID 4-nitro-2,1,3-benzothiadiazole (25 g., 0.138 mole) is slurried in 500 ml. of water. The mixture is heated to 60° C. on a steam bath and a solution of 131 grams of potassium permanganate (0.828 mole) in 2600 ml. of water is added thereto over a period of 45 minutes, the temperature being maintained between 65–70° C. Excess permanganate remaining at the end of the addition period is destroyed by the addition of a small amount of ethanol. The manganese dioxide is separated from the hot solution by filtration and washed with 400 ml. of water. The filtrate and washings are combined and the clear, light-yellow solution of the dipotassium salt of 1,2,5-thiadiazole-3,4-dicarboxylic acid is acidified to a pH of about 1 by the addition of 80 ml. of concentrated nitric acid. The acidified solution is treated with a solution of 23.5 grams of silver nitrate in 50 ml. of water and allowed to cool in the ice box. The white, crystallized mono-silver salt of 1,2,5-thiadiazole-3,4-dicarboxylic acid is separated by filtration and washed with 200 ml. of water in small portions. The dried silver salt weights 30 grams and blackens without melting between 235–255° C. The silver salt is slurried in 300 ml. of water and hydrogen sulfide gas is passed into the mixture until the formation of silver sulfide is complete. The resulting suspension is treated with 5 grams of activated charcoal and is filtered by gravity; the precipitated silver sulfide is washed with 100 ml. of warm water. The combined filtrates and washes are evaporated to a moist residue and the last traces of water are removed by drying over phosphorus pentoxide for a few hours. The 1,2,5-thiadiazole-3,4-dicarboxylic acid thus obtained weighs 14.3 grams. The product melts at 174–178° C. with decomposition. Recrystallization from glacial acetic acid raises the melting point to 184° C.

Analysis calculated for $C_4H_2N_2SO_4$: C, 27.59; H, 1.15; N, 16.09; S, 18.41. Found: C, 28.09; H, 1.26; N, 16.19; S, 18.16.

On standing the substance absorbs water and is converted to the monohydrate.

Analysis calculated for $C_4H_4N_2SO_5$: C, 25.00; H, 2.10. Found: C, 25.04; H, 2.08.

STEP B.—ETHYL 1,2,5-THIADIAZOLE-3-CARBOXYLATE

Three grams of 1,2,5-thiadiazole-3,4-dicarboxylic acid is added to 10 ml. of phenetole and the mixture is heated to 160° C. After about one hour the solution is cooled in ice and the precipitated 1,2,5-thiadiazole-3-carboxylic acid collected by suction filtration. After two recrystallizations from nitromethane the product melts at 162–164° C. Two grams of this product is suspended in 10 ml. of absolute ethanol and the mixture cooled in an ice bath. Hydrogen chloride gas is passed into the suspension for one hour and the mixture then allowed to stand for 2½ days at room temperature with occasional swirling. A small amount of solid material is removed by filtration and the ethanol then is evaporated under reduced pressure with gentle applications of steam. The liquid residue is dissolved in 10 ml. of ether and the solution dried over sodium sulfate. The clear solution is decanted from the sodium sulfate and the ether distilled off at atmospheric pressure. The ester residue is distilled at 70–73° C./25 mm. to give substantially pure ethyl 1,2,5-thiadiazole-3-carboxylate.

Analysis calculated for $C_5H_6N_2SO_2$: C, 37.96; H, 3.82; N, 17.71; S, 20.27. Found: C, 38.34; H, 3.67; N, 18.04; S, 19.97.

Additional runs following substantially the above procedure produced sufficient material to prepare the products of the following examples.

The hydrazide starting material used in Example 11 can be prepared from the ethyl 1,2,5-thiadiazole-3-carboxylate as follows:

*(1,2,5-Thiadiazole-3-Carbonyl)-Hydrazine*

Ethyl 1,2,5-thiadiazole-3-carboxylate (458 mg.) is dissolved in 5 ml. of ethanol and 0.4 ml. of 95% hydrazine is added to the solution. The mixture is warmed slightly whereupon it turns yellow and within a few seconds solidifies. The solid, 1,2,5-thiadiazole-3-carboxylic acid hydrazide, is recrystallized from absolute ethanol and dried in air. The product melts at 153–155° C. Two more recrystallizations raise the melting point to 155–156° C.

Analysis calculated for $C_3H_4N_4SO$: C, 24.99; H, 2.80; N, 38.87; S, 22.24. Found: C, 25.19; H, 2.86; N, 39.28; S, 22.13.

The preparation of the novel compounds of this invention and also the preparation of a suitable dosage form for the oral administration of these compounds is more fully described in the following examples. It is to be understood, however, that the examples are illustrative of the compounds of this invention and of the methods suitable for their preparation and of dosage forms suitable for administering the compounds, and are not to be construed as limiting the invention to the particular compounds, methods, or dosage forms specifically described.

EXAMPLE 1

*1-(1,2,5-Thiadiazole-3-Caronyl)-2-Benzylhydrazine*

A 50 ml., 3-necked flask is equipped with a nitrogen inlet tube, thermometer and reflux condenser whose open end is protected from atmospheric nitrogen with a soda-lime drying tube. The system is flushed with dry nitrogen and then a very slow stream admitted during the reaction period.

The flask is charged with ethyl 1,2,5-thiadiazole-3-carboxylate (15.8 g., 0.1 mole) and freshly distilled benzylhydrazine (18.3 g., 0.15 mole) which has been handled in an atmosphere of nitrogen. The mixture is heated at 135° C. (bath temperature) for 6 hours. Initially the inside temperature rises to about 130° C. The temperature slowly decreases to 117° C. and the mixture begins to reflux as ethanol begins to accumulate as a reaction product.

Upon cooling, a solid separates which is recrystallized from acetonitrile. The yield of 1-(1,2,5-thiadiazole-3-carbonyl)-2-benzylhydrazine as white crystals is 16.9 g. (72%), M.P. 94–97° C. Two recrystallizations from isopropyl alcohol gives material melting at 98–100° C. (corr.).

Analysis calculated for $C_{10}H_{10}N_4OS$: C, 51.26; H, 4.30; N, 23.92. Found: C, 51.41; H, 4.16; N, 23.87.

EXAMPLE 2

1-(1,2,5-Thiadiazole-3-Carbonyl)-2-(α-Methylbenzyl) Hydrazine

Ethyl 1,2,5-thiadiazole-3-carboxylate (6.38 g., 0.0404 mole) and (α-methylbenzyl)hydrazine (7.5 g., 0.055 mole) are heated via a bath at 132° C. for 6 hours in an apparatus and under substantially the same conditions described in Example 1. The solid that separates upon cooling is recrystallized from isopropyl alcohol to give 10 g. (90%) of 1-(1,2,5-thiadiazole-3-carbonyl)-2-(α-methylbenzyl)hydrazine as white crystals melting at 103.5–105.5° C. A second crystallization from the same solvent gives 8.66 g., M.P. 105.5–106.5° C. (corr.).

Analysis calculated for $C_{11}H_{12}N_4OS$: C, 53.21; H, 4.87; N, 22.56. Found: C, 53.31; H, 4.77; N, 22.48.

EXAMPLE 3

1-(1,2,5-Thiadiazole-3-Carbonyl)-2-(α,α-Dimethylbenzyl)Hydrazine

Ethyle 1,2,5-thiadiazole-3-carboxylate (8.09 g., 0.0512 mole) and (α,α-dimethylbenzyl)hydrazine (9.6 g., 0.064 mole) [prepared by the method of Overberger and Di Giulio, J. Am. Chem. Soc., 80, 6562 (1958)] is heated in a bath at 132° C. for 7¾ hours in an apparatus and under substantially the same conditions described in Example 1. The solid product is recrystallized from boiling hexane to give 8.16 g. (61%) of 1-(1,2,5-thiadiazole-3-carbonyl)-2-(α,α-dimethylbenzyl)hydrazine, M.P. 79–81.5° C. Two more recrystallizations from hexane gives 7.20 g., M.P. 97–98° C. (corr.).

Analysis calculated for $C_{12}H_{14}N_4OS$: C, 54.94; H, 5.38; N, 21.36. Found: C, 55.00; H, 5.30; N, 21.55.

EXAMPLE 4

1-(1,2,5-Thiadiazole-3-Carbonyl)-2-Isopropylhydrazine

Ethyl 1,2,5-thiadiazole-3-carboxylate (12.64 g., 0.08 mole) and isopropylhydrazine (7.0 g., 0.094 mole) are heated via a bath at 105° C. for six hours in an apparatus under substantially the same conditions described in Example 1. After cooling and triturating the product with pentane, a solid separates, 14.1 g. (95%). Three recrystallizations from hexane give 1-(1,2,5-thiadiazole-3-carbonyl)-2-isopropylhydrazine as white crystals, melting at 63–64° C. (corr.).

Analysis calculated for $C_6H_{10}N_4OS$: C, 38.69; H, 5.41; N, 30.09. Found: C, 39.03; H, 5.62; N, 30.14.

EXAMPLE 5

1-(1,2,5-Thiadiazole-3-Carbonyl)-2-(1-Methyl-2-Phenylethyl)-Hydrazine Hydrochloride Ethyl 1,2,5-thiadiazole-3-carboxylate (8.7 g., 0.055 mole) and (1-methyl-2-phenylethyl)hydrazine (9.46 g., 0.063 mole) are heated in a bath at 135° C. for 10 hours in an apparatus and under substantially the same conditions described in Example 1. The reaction mixture is cooled, suspended in water (50 ml.) and made strongly alkaline by the addition of 20% sodium hydroxide solution.

The mixture is thoroughly stirred and then extracted with two 50 ml. portions of ether. The clear aqueous solution is treated, dropwise, with acetic acid until precipitation is complete (pH=5.5 as measured by "Hydrion" paper, a pH-indicator paper sold by Micro Essential Labs, Brooklyn 10, New York). The oil that separates is extracted with ether and the ether extract dried over anhydrous sodium sulfate.

The dry ether solution is treated with an etherial solution containing slightly more than one molar equivalent of hydrogen chloride. The white solid that separates is filtered off, washed with ether, and dried. The yield of 1-(1,2,5-thiadiazole-3-carbonyl)-2-(1-methyl-2-phenylethyl)hydrazine hydrochloride is 14 g. (86%), M.P. 185–191° C.

The hydrochloride salt is suspended in water (50 ml.) and treated with 2.5 molar equivalents of 20% sodium hydroxide solution. After extracting with 50 ml. of ether, the aqueous solution is acidified with acetic acid, extracted with ether, dried and precipitated with etherial hydrogen chloride as before. The hydrochloride salt is purified by dissolving in 55% ethanol-water mixture and precipitating with an equal volume of 37% hydrochloric acid. A second reprecipitation gives 1-(1,2,5-thiadiazole-3-carbonyl)-2-(1-methyl-2-phenylethyl)hydrazine hydrochloride as a white product, M.P. 196.5–198.5° C. (corr.).

Analysis calculated for $C_{12}H_{15}ClN_4OS$: C, 48.23; H, 5.06; Cl, 11.87; N, 18.75. Found: C, 48.34; H, 4.99; Cl, 11.70; N, 18.37.

EXAMPLE 6

1-(1,2,5-Thiadiazole-3-Carbonyl)-2-Phenethyl-Hydrazine Hydrochloride

Phenethylhydrazine (20.4 g., 0.15 mole) and ethyl 1,2,5-thiadiazole-3-carboxylate (15.8 g., 0.1 mole) are heated in a bath at 118° C. for 6 hours in an apparatus and under substantially the same conditions described in Example 1. The product is isolated and converted to the hydrochloride salt as described in Example 5. The yield of 1-(1,2,5-thiadiazole-3-carbonyl)-2-phenethyl-hydrazine hydrochloride is 27.9 g. (98%), M.P. 180–183° C. Purification is effected by dissolving in a 50% ethanol-water mixture and precipitating with an equal volume of 37% hydrochloric acid. The melting point of the purified material is 187.5–191.5° C. (corr.).

Analysis calculated for $C_{11}H_{13}ClN_4OS$: C, 46.39; H, 4.60; N, 19.68. Found: C, 46.56; H, 4.58; N, 19.67.

EXAMPLE 7

1-(1,2,5-Thiadiazole-3-Carbonyl)-2-(o-Chlorobenzyl)Hydrazine

Ethyl 1,2,5-thiadiazole-3-carboxylate (12.7 g., 0.08 mole) and o-chlorobenzylhydrazine (15.7 g., 0.1 mole) are heated in a bath at 120° C. for 5½ hours in an apparatus and under substantially the same conditions described in Example 1. The reaction mixture is cooled, water (60 ml.) and an excess of one molar equivalent of 10N sodium hydroxide solution added. The resulting solution is extracted with two 50 ml.-portions of ether.

The aqueous solution is acidified with acetic acid (to pH 5.5 as measured by "Hydrion" paper). The oil that separates is extracted with ether and the ether extract evaporated to give 19.3 g. (90%) of 1-(1,2,5-thiadiazole-3-carbonyl)-2-(o-chlorobenzyl)hydrazine, M.P. 55–65° C. One recrystallization from a 2:1 mixture of hexane and cyclohexane followed by two recrystallizations from cyclohexane gives material melting at 71.5–72.5° C. (corr.).

Analysis calculated for $C_{10}H_9ClN_4OS$: C, 44.69; H, 3.38; Cl, 13.19; N, 20.85. Found: C, 44.75; H. 3.72; Cl, 13.18; N, 20.65.

EXAMPLE 8

1-(1,2,5-Thiadiazole-3-Carbonyl)-2-(m-Chlorobenzyl)Hydrazine m-Chlorobenzylhydrazine (13.3 g., 0.085 mole) and ethyl 1,2,5-thiadiazole-3-carboxylate (12.7 g., 0.08 mole) are heated in a bath at 120° C. for 6¼ hours in an apparatus and under substantially the same conditions described in Example 1. The product is isolated as described in Example 7. The yield of crude product is 18.9 g. (88%). One recrystallization from a 1:1 mixture of hexane and cyclohexane and two recrystallizations from cyclohexane give 1-(1,2,5-thiadiazole-3-carbonyl)-2-(m-chlorobenzyl)hydrazine, melting at 64.5–65–5° C. (corr.).

Analysis calculated for $C_{10}H_9ClN_4OS$: C, 44.69; H, 3.38; N, 20.85. Found: C, 44.83; H, 3.60; N, 20.66.

EXAMPLE 9

1-(1,2,5-Thiadiazole-3-Carbonyl)-2-(p-Chlorobenzyl)Hydrazine

STEP A

A 1-liter, 4-necked flask is fitted with a reflux condenser, mechanical stirrer, dropping funnel, and gas-inlet tube. The system is flushed with nitrogen and then a very slow stream admitted during the reaction period. Hydrazine hydrate (150 g., 3 mole) and ethanol (300 ml.) are placed in the flask. The stirrer is started and the p-chlorobenzyl chloride (96.6 g., 0.6 mole) added dropwise over 30 minutes and washed in with another 50 ml. of ethanol.

After the addition is complete, the mixture is stirred for two hours without external heat and then refluxed for 2 hours. The two-phase mixture is cooled in an ice-bath and 37% hydrochloric acid (400 ml., 4.8 moles) added dropwise. The solid (A) that separates is removed by filtration and dried.

The filtrate is evaporated to dryness in vacuo and the solid residue combined with solid (A). The solid is extracted with five 400 ml.-portions of boiling ethanol. The combined extracts are evaporated to dryness in vacuo. The yield of residue is 122.9 g. The solid is stirred with water (500 ml.) previously boiled and cooled under nitrogen. A small amount of insoluble solid is removed by filtration under nitrogen. The filtrate is cooled in an ice-salt bath. A nitrogen atmosphere is maintained during all subsequent operations. Solid sodium hydroxide is added to the solution until the separation of the oily layer is complete. The temperature is not permitted to exceed 25° C.

The mixture is extracted with two 250 ml.-portions of ether. The combined ether extracts are dried first over potassium carbonate and then over two subsequent portions of sodium hydroxide pellets. The solution is filtered and the ether distilled off. The residue is distilled at reduced presure. The yield of p-chlorobenzylhydrazine boiling at 98–100° C. at 0.1 mm. pressure is 59.7 g. (64%), M.P. 41° C. This material is kept in an atmosphere of nitrogen until used in the next step.

STEP B

Ethyl 1,2,5-thiadiazole-3-carboxylate (12.7 g., 0.08 mole) and p-chlorobenzylhydrazine (15.7 g., 0.1 mole) are heated at 120° C. for 4½ hours in an apparatus and under substantially the same conditions described in Example 1. The product is recrystallized from isopropyl alcohol to give 19 g. (88%) of 1-(1,2,5-thiadiazole-3-carbonyl)-2-(p-chhorobenzyl)hydrazine, M.P. 123–125.5° C. Two more recrystallizations give material melting at 128–129° C. (corr.).

Analysis calculated for $C_{10}H_9ClN_4OS$: C, 44.69; H, 3.38; Cl, 13.19; N, 20.85. Found: C, 45.05; H, 3.58; Cl, 12.92; N, 21.03.

EXAMPLE 10

1-(1,2,5-Thiadiazole-3-Carbonyl)-2-(3,4-Dichlorobenzyl)-Hydrazine

STEP A 3,4-dichlorobenzyl chloride (117.3 g., 0.6 mole) is added to hydrazine hydrate (150.0 g., 3 mole) in ethanol (350 ml.) and processed in substantially the same manner described in Example 9. After treatment with 37% hydrochloric acid (400 ml., 4.8 moles), filtering and concentrating the filtrate to dryness, the combined residues are extracted with ethanol (2 liters total). Concentration of the extract to dryness in vacuo gives 130 g. of solid product.

The solid is dissolved in oxygen-free water (450 ml.) and 3,4-dichlorobenzylhydrazine as the free base isolated in substantially the same manner described in Example 9. The product distills at 115–118° C. at 0.2 mm. The yield is 74.6 g. (65%). This material is stored under nitrogen until used in the next step.

A small portion of the free base is converted to the hydrochloride salt which, after recrystallization from ethanol, melts at 163.5–164.5° C. (corr.).

Analysis calculated for $C_7H_9Cl_3N_2$: C, 36.95; H, 3.99; N, 12.31; Found: C, 37.25; H, 4.11; N, 12.47.

STEP B

Ethyl 1,2,5-thiadiazole-3-carboxylate (12.7 g., 0.08 mole) and 3,4-dichlorobenzylhydrazine (19.1 g., 0.1 mole) are heated at 135° C. for 7⅓ hours in an apparatus and under substantially the same conditions described in Example 1. The solid which separates upon cooling is triturated with ether, filtered, and dried. The product is recrystallized from isopropyl alcohol to give 20.6 g. (85%) of 1-(1,2,5-thiadiazole-3-carbonyl)-2-(3,4-dichlorobenzyl)hydrazine, melting at 106.5–108° C. Two more recrystallizations from alcohol give material melting at 110.5–111.5° C. (corr.).

Analysis calculated for $C_{10}H_8Cl_2N_4OS$: C, 39.62; H, 2.66; N, 18.48. Found: C, 39.69; H, 2.93; N, 18.33.

EXAMPLE 11

1-(1,2,5-Thiadiazole-3-Carbonyl)-2-Benzylhydrazine and 1-(1,2,5-Thiadiazole-3-Carbonyl)-2,2-Dibenzylhydrazine A 500 ml., 4-necked flask is equipped with a thermometer, dropping funnel, reflux condenser protected with a drying tube and mechanicl stirrer. Dry methanol (200 ml.) is added to the flask and sodium (2.13 g., 0.0926 mole) added. As soon as the sodium reacts, (1,2,5-thiadiazole-3-carbonyl)hydrazine (13.35 g., 0.0926 mole) is added. The solid dissolves upon stirring producing a yellow solution.

The solution is kept at 25° C. by means of a cooling bath and benzyl bromide (15.8 g., 0.0926 mole) added dropwise, with stirring, over 15 minutes. The funnel is washed with methanol (50 ml.) and the mixture stirred at room temperature for 4 hours.

After standing overnight the yellow solid that separates is filtered off and the mother liquor concentrated to dryness to produce another solid. The solids are combined and treated with water (150 ml.) and 38% hydrochloric acid (9 ml.). The insoluble material is filtered off, washed with water, and dried. (The mother liquor (A) is saved for use later.)

The yield of dry product is 13.6 g. (91%), M.P. 134–139° C. Recrystallization, twice from acetonitrile and once from isopropyl alcohol gives material melting at 142.5–143.5° C. (corr.). The elementary analysis corresponds to that calculated for $C_{17}H_{16}N_4OS$: C, 62.94; H, 4.97; N, 17.27. Found C, 62.87; H, 4.95; N, 17.46.

These data and infra-red spectra analysis indicate this compound to be 1-(1,2,5-thiadiazole-3-carbonyl)-2,2-dibenzylhydrazine.

Mother liquor (A) is carefully neutralized to litmus paper with 10N sodium hydroxide solution. The solid that separates is filtered off, washed with water, and dried. The yield is 1.1 g. (5%), M.P. 91–94° C. Recrystallization from isopropyl alcohol gives material melting at 98–99° C. (corr.). This compound is 1-(1,2,5-thiadiazole-3-carbonyl)-2-benzylhydrazine and is identical to the product obtained by the process of Example 1 from ethyl 1,2,5-thiadiazole-3-carboxylate and benzylhydrazine.

EXAMPLE 12

1-(1,2,5-Thiadiazole-3-Carbonyl)-2-Butylhydrazine

By replacing the benzylhydrazine employed in Example 1 by an equimolecular quantity of butylhydrazine and following substantially the same procedure described in Example 1, there is obtained 1-(1,2,5-thiadiazole-3-carbonyl)-2-butylhydrazine.

EXAMPLE 13

1-(1,2,5-Thiadiazole-3-Carbonyl)-2-(p-Methoxybenzyl)-Hydrazine

By replacing the benzylhydrazine employed in Example 1 by an equimolecular quantity of p-methoxybenzylhydrazine and following substantially the same procedure described in Example 1, there is obtained 1-(1,2,5-thiadiazole-3-carbonyl)-2-(p-methoxybenzyl)hydrazine.

EXAMPLE 14

1-(1,2,5-Thiadiazole-3-Carbonyl)-2-(p-Methylbenzyl)Hydrazine

By replacing the benzylhydrazine employed in Example 1 by an equimolecular quantity of p-methylbenzylhydrazine and following substantially the same procedure described in Example 1, there is obtained 1-(1,2,5-thiadiazole-3-carbonyl)-2-(p-methylbenzyl)hydrazine.

EXAMPLE 15

1-(1,2,5-Thiadiazole-3-Carbonyl)-2-Cyclopentylhydrazine

By replacing the benzylhydrazine employed in Example 1 by an equimolecular quantity of cyclopentylhydrazine and following substantially the same procedure described in Example 1, there is obtained 1-(1,2,5-thiadiazole-3-carbonyl)-2-cyclopentylhydrazine.

EXAMPLE 16

1-(1,2,5-Thiadiazole-3-Carbonyl)-2-(2-Phenyl-1-Cyclopropyl)Hydrazine

2-Phenylcyclopropylamine (33.3 g., 0.25 mole) is mixed with 10 ml. of water and heated to reflux. The mixture is stirred and a solution of hydroxylamine-O-sulfonic acid (prepared by the method of Sommer, Schultz and Nassau, Z. anorg. u. allgem. Chem., 147, 142 (1925) (2.38 g., 0.021 mole) in 7.5 ml. of water is added over a period of 8 minutes. The mixture then is cooled, acidified with glacial acetic acid (about 15 mole) and warmed to 50° C. with benzaldehyde (4.5 g., 0.0425 mole) for 10 minutes. The resulting emulsion is cooled and extracted with three 50 ml. portions of ether.

The combined ether extracts are added to a solution of 3.5 g., (0.028 mole) of oxalic acid dihydrate in 12.5 ml. of water and the mixture steam diluted until no more benzaldehyde is detected in the distillate. The residue is concentrated to dryness in vacuo and the solid residue recrystallized to give white crystalline (2-phenylcyclopropyl)-hydrazine hydrogen oxalate.

The free base can be generated by dissolving the oxalate salt in water, cooling and saturating with sodium hydroxide in an atmosphere of nitrogen. The base is extrated with ether, dried over potassium carbonate and then over sodium hydroxide. The (2-phenylcyclopropyl)-hydrazine can be isolated by evaporating the solvent in an atmosphere of nitrogen and can be purified by distillation at reduced pressure.

By replacing the benzylhydrazine employed in Example 1 by an equimolecular quantity of (2-phenylcyclopropyl)-hydrazine prepared as described above, and following substantially the same procedure described in Example 1, there is obtained 1-(1,2,5-thiadiazole-3-carbonyl)-2-(2-phenyl-1-cyclopropyl)hydrazine.

EXAMPLE 17

1-(1,2,5-Thiadiazole-3-Carbonyl)-2-Benzyl-2-Methylhydrazine

In a 500 ml., 4-necked flask fitted with a mechanical stirrer, thermometer, dropping funnel, and reflux condenser capped with a soda-lime drying tube is placed absolute methanol (150 ml.). Sodium (1.18 g., 0.05122 mole) is added and after it has dissolved, 1-(1,2,5-thiadiazole-3-carbonyl)-2-benzylhydrazine is added. The clear orange solution is cooled to 25° C. and a solution of methyl iodide (8.73 g., 0.06146 mole) in methanol (50 ml.) is added dropwise over a period of 15 minutes.

The solution is stirred at room temperature for 15 minutes and then refluxed for 2 hours. A second portion of methyl iodide 730 mg. (0.005 mole) is added and refluxing continued for another 2 hours. The solvent is distilled off at reduced pressure and the residue suspended in water (100 ml.) and 40% sodium hydroxide (10.2 ml., 0.102 mole) added. The solution is extracted with ether (25 ml.).

The aqueous solution is made acid (pH 5 as measured by "Hydrion" paper) with acetic acid and the oil that separates is extracted with two (50 ml.) portions of ether. The combined extracts are dried over anhydrous sodium sulfate and the ether removed by evaporation. The yield of crystalline product is 11.6 g. (91%). Recrystallization from isopropyl alcohol gives 8.4 g. of 1-(1,2,5 - thiadiazole - 3 - carbonyl) - 2 - benzyl - 2 - methylhydrazine, M.P. 98–100° C. (corr.). A second recrystallization from isopropyl alcohol gives material melting at 98.5–100° C.

Anaylsis calculated for $C_{11}H_{12}N_4OS$: C, 53.21; H, 4.87; N, 22.56. Found: C, 53.25; H, 5.01; N, 22.36.

EXAMPLE 18

1-(1,2,5-Thiadiazole-3-Carbonyl)-2-Benzyl-2-(o-Chlorobenzyl)Hydrazine

By replacing the 1-(1,2,5-thiadiazole-3-carbonyl)-2-benzylhydrazine and methyl iodide employed in Example 17 by equimolecular quantities of 1-(1,2,5-thiadiazole-3-carbonyl)-2-(o-chlorobenzyl)hydrazine (prepared as described in Example 7) and benzyl bromide respectively, and following substantially the same procedure described in Example 17, there is obtained 1-(1,2,5-thiadiazole-3-carbonyl)-2-benzyl-2-(o-chlorobenzyl)hydrazine.

EXAMPLE 19

1-(1,2,5-Thiadiazole-3-Carbonyl)-2-[2-(N-Benzylcarbamoyl)-Ethyl]Hydrazine

In a 1-liter, 3-necked flask equipped with a mechanical stirrer and reflux condenser, capped with a calcium chloride drying tube, is placed dry methanol (500 ml.) and sodium (4 g., 0.174 mole) is added in small pieces. After all the sodium has reacted, (1,2,5-thiadiazole-3-carbonyl)-hydrazine (28.83 g., 0.2 mole) is added and the resulting solution heated to boiling. N-Benzyl-3-chloropropanamide (19.77 g., 0.1 mole) is added and the orange solution that results is stirred and refluxed.

After about 30 minutes of heating, a solid begins to separate. After 5 hours, the mixture is cooled, filtered and the residue (A) saved. The filtrate is concentrated to dryness on a steam bath at reduced pressure. The residual material and solid, A, are combined, suspended in water (150 ml.) and 5N sodium hydroxide solution (45 ml.) added. After stirring and warming, the mixture is filtered to remove the insoluble material (B).

The filtrate is acidified with 12N hydrochloric acid. (The solution has a pH of 7.0 as measured by "Hydrion" paper.) The solid that separates is separated by filtration and washed with a little water. The yield of dry product is 8.5 g. Recrystallization from a mixture of ethanol and water gives 4.05 g., M.P. 113–115° C. Two additional recrystallizations from benzene give 3.26 g., M.P. 117–118.5° (corr.).

Analysis calculated for $C_{13}H_{15}O_2N_5S$: C, 51.13; H, 4.95; N, 22.94; S, 10.50. Found: C, 51.17; H, 5.15; N, 22.95; S, 10.35.

EXAMPLE 20

*1-(1,2,5-Thiadiazole-3-Carbonyl)-2-(1-Methyl-2-Dimethylaminoethyl)Hydrazine*

By replacing the benzylhydrazine employed in Example 1 with an equimolar quantity of (1-methyl-2-dimethylaminoethyl)hydrazine, and following substantially the same procedure described in Example 1, there is obtained 1 - (1,2,5 - thiadiazole - 3 - carbonyl) - 2 - (1 - methyl - 2-dimethylaminoethyl)hydrazine. The dihydrochloride salt can be prepared by treating the base in ether with two equivalents of hydrogen chloride in ether.

EXAMPLE 21

*1-(1,2,5-Thiadiazole-3-Carbonyl)-2-(2-Diethylaminoethyl)Hydrazine*

By replacing the benzylhydrazine employed in Example 1 with an equimolar quantity of (2-diethylaminoethyl)hydrazine and following essentially the same procedure described in Example 1, there is obtained 1-(1,2,5-thiadiazole - 3 - carbonyl) - 2 - (2 - diethylaminoethyl)-hydrazine.

EXAMPLE 22

*1-(1,2,5-Thiadiazole-3-Carbonyl)-2-(2-Diethylaminoethyl)-2-Ethylhydrazine Ethiodide*

By replacing, in Example 17, the hydrazine and the methyl iodide respectively by an equivalent quantity of 1 - (1,2,5 - thiadiazole - 3 - carbonyl) - 2 - (2 - diethylaminoethyl)hydrazine [prepared as described in Example 21] and two equivalents of ethyl iodide and following substantially the same procedure described in Example 17 (with the exception that stirring is continued for 24 hours instead of 15 minutes and then the mixture is refluxed for 4 hours) there is produced 1-(1,2,5-thiadiazole-3-carbonyl) - 2 - (2 - diethylaminoethyl) - 2 - ethylhydrazine ethiodide.

EXAMPLE 23

*1-(1,2,5-Thiadiazole-3-Carbonyl)-2-(2-Diethylamino-4-Methylpentyl)Hydrazine*

By replacing the benzylhydrazine employed in Example 1 with an equimolar quantity of (2-diethylamino-4-methylpentyl)hydrazine, and following essentially the same procedure described in Example 1, there is obtained 1-(1,2,5-thiadiazole-3-carbonyl)-2-(2-diethylamino-4-methylpentyl)hydrazine.

EXAMPLE 24

*1-(1,2,5-Thiadiazole-3-Carbonyl)-2-[1-Methyl 2-(1-Piperidyl)Ethyl]Hydrazine*

By replacing the benzylhydrazine employed in Example 1 with an equimolar quantity of [1-methyl-2-(1-piperidyl)ethyl]hydrazine, and following essentially the same procedure described in Example 1, there is obtained 1 - (1,2,5 - thiadiazole - 3 - carbonyl) - 2 - [1 - methyl - 2-(1-piperidyl)ethyl]hydrazine.

EXAMPLE 25

*1-(1,2,5-Thiadiazole-3-carbonyl)-2-(1-methyl-3-dimethylaminopropyl)hydrazine*

By replacing the benzylhydrazine employed in Example 1 with an equimolar quantity of (1-methyl-3-dimethylaminopropyl)-hydrazine, and following essentially the same procedure described in Example 1, there is obtained 1 - (1,2,5 - thiadiazole - 3 - carbonyl) - 2 - (1 - methyl-3-dimethylaminopropyl)hydrazine.

EXAMPLE 26

*1-(1,2,5-Thiadiazole-3-carbonyl)-2-(1-ethyl-4-piperidyl)hydrazine*

By replacing the benzylhydrazine employed in Example 1 with an equimolar quantity of (1-ethyl-4-piperidyl)hydrazine and following essentially the same procedure described in Example 1, there is obtained 1-(1,2,5-thiadiazole-3-carbonyl)-2-(1-ethyl-4-piperidyl)hydrazine.

EXAMPLE 27

*1-(1,2,5-Thiadiazole-3-carbonyl)-2-(1-isopropyl-4-piperidyl)hydrazine*

By replacing the benzylhydrazine employed in Example 1 with an equimolar quantity of (1-isopropyl-4-piperidyl)-hydrazine and following essentially the same procedure described in Example 1, there is obtained 1-(1,2,5-thiadiazole - 3 - carbonyl) - 2 - (1 - isopropyl - 4 - piperidyl)hydrazine.

EXAMPLE 28

*1-(1,2,5-Thiadiazole-3-carbonyl)-2-(1-methyl-3-pyrrolidyl)hydrazine*

By replacing the benzylhydrazine employed in Example 1, with an equimolar quantity of (1-methyl-3-pyrrolidyl)hydrazine and following essentially the same procedure described in Example 1, there is obtained 1-(1,2,5-thiadiazole - 3 - carbonyl) - 2 - (1 - methyl - 3 - pyrrolidyl)hydrazine.

EXAMPLE 29

*1-(1,2,5-Thiadiazole-3-carbonyl)-2-(1-butyl-3-pyrrolidyl)hydrazine*

By replacing the benzylhydrazine employed in Example 1 with an equimolar quantity of (1-butyl-3-pyrrolidyl)-hydrazine and following essentially the same procedure described in Example 1, there is obtained 1-(1,2,5-thiadiazole - 3 - carbonyl) - 2 - (1 - butyl - 3 - pyrrolidyl)hydrazine.

EXAMPLE 30

*1-(1,2,5-Thiadiazole-3-carbonyl)-2-(N-benzylcarbamoylmethyl)hydrazine*

By replacing the N-benzyl-3-chloropropanamide of Example 19 with an equimolar quantity of N-benzylbromoacetamide and following essentially the same procedure described in Example 19, there is obtained 1-(1,2,5 - thiadiazole - 3 - carbonyl) - 2 - (N - benzylcarbamoylmethyl)hydrazine.

EXAMPLE 31

*1-(1,2,5-Thiadiazole-3-carbonyl)-2-(N-benzyl carbamoylmethyl)-2-methylhydrazine*

By replacing the hydrazine and the methyl iodide employed in Example 17 by equivalent quantities of 1-(1,2,5-thiadiazole - 3 - carbonyl) - 2 - (N - benzylcarbamoylmethyl)hydrazine [prepared as described in Example 30] and methyl iodide, and following substantially the same procedure described in Example 17, there is obtained 1-(1,2,5 - thiadiazole - 3 - carbonyl) - 2 - (N - benzylcarbamoylmethyl)-2-methylhydrazine.

EXAMPLE 32

*1-(1,2,5-Thiadiazole-3-carbonyl)-2-[N-(o-methylbenzyl)carbamoylmethyl]-hydrazine*

By replacing the N-benzyl-3-chloropropanamide employed in Example 19 with an equimolar quantity of N-(o-methylbenzyl)chloroacetamide, and following essentially the same procedure described in Example 19, there is obtained 1 - (1,2,5 - thiadiazole - 3 - carbonyl) - 2- [N-(o-methylbenzyl)carbamoylmethyl]hydrazine.

EXAMPLE 33

*1-(1,2,5-Thiadiazole-3-carbonyl)-2-(N-phenethyl-carbamoylmethyl)hydrazine*

By replacing the N-benzyl-3-chloropropanamide employed in Example 19 with an equimolar quantity of N-phenethylchloroacetamide, and following essentially the same procedure described in Example 19, there is obtained 1 - (1,2,5 - thiadiazole - 3 - carbonyl) - 2 - (N-phenethylcarbamoylmethyl)hydrazine.

EXAMPLE 34

*1-(1,2,5-Thiadiazole-3-carbonyl)-2-[2-(N-o tolylcarbamoyl)ethyl]hydrazine*

By replacing the N-benzyl-3-chloropropanamide employed in Example 19 with an equimolar quantity of N-o-tolyl-3-chloropropanamide, and following essentially the same procedure described in Example 19, there is obtained 1 - (1,2,5 - thiadiazole - 3 - carbonyl) - 2 - [2 - (N - o-tolylcarbamoyl)ethyl]hydrazine.

EXAMPLE 35

*1-(1,2,5-Thiadiazole-3-carbonyl)-2-[N-(p-ethoxy-phenyl)carbamoylmethyl]hydrazine*

By replacing the N-benzyl-3-chloropropanamide employed in Example 19 with an equimolar quantity of N-(p-ethoxyphenyl)chloroacetamide, and following essentially the same procedure described in Example 19, there is obtained 1 - (1,2,5 - thiadiazole - 3 - carbonyl) - 2- [N-(p-ethoxyphenyl)carbamoylmethyl]hydrazine.

EXAMPLE 36

*1-(1,2,5-Thiadiazole-3-carbonyl)-2-(N-methyl-N-phenylcarbamoylmethyl)hydrazine*

By replacing the N-benzyl-3-chloropropanamide employed in Example 19 with an equimolar quantity of N-methyl-N-phenylchloroacetamide, and following essentially the same procedure described in Example 19, there is obtained 1 - (1,2,5 - thiadiazole - 3 - carbonyl) - 2- (N-methyl-N-phenylcarbamoylmethyl)hydrazine.

EXAMPLE 37

*1-(1,2,5-Thiadiazole-3-carbonyl)-2-[2-(N-phenyl-carbamoyl)ethyl]hydrazine*

By replacing the N-benzyl-3-chloropropanamide employed in Example 19 with an equimolar quantity of N-phenyl-3-chloropropanamide, and following essentially the same procedure described in Example 19, there is obtained 1 - (1,2,5 - thiadiazole - 3 - carbonyl) - 2 - [2- (N-phenylcarbamoyl)ethyl]hydrazine.

EXAMPLE 38

*1-(1,2,5-Thiadiazole-3-Carbonyl)-2-[3-(N-Benzylcarbamoyl)Propyl]Hydrazine*

By replacing the N-benzyl-3-chloropropanamide employed in Example 19 with an equimolar quantity of N-benzyl-4-chlorobutanamide and following essentially the same procedure described in Example 19, there is obtained 1 - (1,2,5 - thiadiazole - 3 - carbonyl) - 2 - [3-(N-benzylcarbamoyl)propyl]hydrazine.

EXAMPLE 39

*1-(1,2,5-Thiadiazole-3-Carbonyl)-2-(2-Phenoxyethyl)Hydrazine*

By replacing the N-benzyl-3-chloropropanamide employed in Example 19 with an equimolar quantity of 2-phenoxyethyl bromide and following essentially the same procedure described in Example 19, there is obtained 1- (1,2,5-thiadiazole - 3 - carbonyl) - 2 - (2-phenoxyethyl)-hydrazine.

EXAMPLE 40

*1-(1,2,5-Thiadiazole-3-Carbonyl)-2-(2-Phenoxyethyl)-2-(p-Chlorobenzyl)Hydrazine*

By replacing the hydrazine and the methyl iodide employed in Example 17 by equivalent quantities of 1-(1,2,5-thiadiazole-3-carbonyl)-2-(phenoxyethyl)hydrazine [prepared as described in Example 39] and p-chlorobenzyl bromide, and following substantially the same procedure described in Example 17, there is obtained 1-(1,2,5-thiadiazole-3-carbonyl)-2-(2 - phenoxyethyl)-2-(p-chlorobenzyl)hydrazine.

EXAMPLE 41

*1-(1,2,5-Thiadiazole-3-Carbonyl)-2-(2-p-Bromophenoxyethyl)Hydrazine*

By replacing the N-benzyl-3-chloropropanamide employed in Example 19 with an equimolar quantity of 2-p-bromophenoxyethyl bromide, and following essentially the procedure described in Example 19, there is obtained 1-(1,2,5 - thiadiazole-3-carbonyl)-2-(2-p-bromophenoxyethyl)hydrazine.

EXAMPLE 42

*1-(1,2,5-Thiadiazole-3-Carbonyl)-2-(2-o-Chlorophenoxyethyl)Hydrazine*

By replacing the N-benzyl-3-chloropropanamide employed in Example 19 with an equimolar quantity of 2-o-chlorophenoxyethyl bromide, and following essentially the same procedure described in Example 19, there is obtained 1-(1,2,5-thiadiazole - 3 - carbonyl)-2-(2-o-chlorophenoxyethyl)hydrazine.

EXAMPLE 43

*1-(1,2,5-Thiadiazole-3-Carbonyl)-2-(2-m-Tolyloxyethyl)Hydrazine*

By replacing the N-benzyl-3-chloropropanamide employed in Example 19 with an equimolar quantity of 2-m-tolyloxyethyl bromide, and following essentially the same procedure described in Example 19, there is obtained 1 - (1,2,5-thiadiazole-3-carbonyl)-2-(2-m-tolyloxyethyl)hydrazine.

EXAMPLE 44

*1-(1,2,5-Thiadiazole-3-Carbonyl)-2-(2-m-Methoxyphenoxyethyl)Hydrazine*

By replacing the N-benzyl-3-chloropropanamide employed in Example 19 with an equimolar quantity of 2-m-methoxyphenoxyethyl bromide, and following essentially the same procedure described in Example 19, there is obtained 1-(1,2,5-thiadiazole-3-carbonyl)-2-(2 - m-methoxyphenoxyethyl)hydrazine.

EXAMPLE 45

*1-(1,2,5-Thiadiazole-3-Carbonyl)-2-(2-Benzyloxyethyl)Hydrazine*

By replacing the N-benzyl-3-chloropropanamide employed in Example 19 with an equimolar quantity of 2-benzyloxyethyl chloride, and following essentially the same procedure described in Example 19, there is obtained 1-(1,2,5-thiadiazole-3-carbonyl)-2-(2 - benzyloxyethyl)hydrazine.

EXAMPLE 46

*1-(1,2,5-Thiadiazole-3-Carbonyl)-2-(3-Phenoxypropyl)Hydrazine*

By replacing the N-benzyl-3-chloropropanamide employed in Example 19 with an equimolar quantity of 3-phenoxypropyl bromide, and following essentially the same procedure described in Example 19, there is obtained 1-(1,2,5-thiadiazole - 3 - carbonyl)-2-(3-phenoxypropyl)hydrazine.

EXAMPLE 47

*1-(1,2,5-Thiadiazole-3-Carbonyl)-2-(4-Phenoxybutyl)Hydrazine*

By replacing the N-benzyl-3-chloropropanamide employed in Example 19 with an equimolar quantity of 4- phenoxybutyl bromide, and following essentially the same procedure described in Example 19, there is obtained 1-(1,2,5-thiadiazole-3-carbonyl) - 2 - (4-phenoxybutyl)hydrazine.

EXAMPLE 48

*1-(1,2,5-Thiadiazole-3-Carbonyl)-2-(5-Phenoxypentyl)Hydrazine*

By replacing the N-benzyl-3-chloropropanamide employed in Example 19 with an equimolar quantity of 5-phenoxypentyl bromide, and following essentially the same procedure described in Example 19, there is obtained 1-(1,2,5-thiadiazole - 3 - carbonyl)-2-(5-phenoxypentyl)hydrazine.

EXAMPLE 49

*1-(1,2,5-Thiadiazole-3-Carbonyl)-2-(2-Phenylmercaptoethyl)Hydrazine*

By replacing the N-benzyl-3-chloropropanamide employed in Example 19 with an equimolar quantity of 2-phenylmercaptoethyl bromide, and following essentially the same procedure described in Example 19, there is obtained 1 - (1,2,5-thiadiazole-3-carbonyl)-2-(2-phenylmercaptoethyl)hydrazine.

EXAMPLE 50

*1-(1,2,5-Thiadiazole-3-carbonyl)-2-(2-Phenylmercaptoethyl)-2-Methylhydrazine*

By replacing the hydrazine employed in Example 17 by an equivalent quantity of 1-(1,2,5-thiadiazole-3-carbonyl)-2-(2-phenylmercaptoethyl)hydrazine [prepared as described in Example 49], and following substantially the same procedure described in Example 17, there is obtained 1-(1,2,5-thiadiazole - 3 - carbonyl)-2-(2 - phenylmercaptoethyl)-2-methylhydrazine.

EXAMPLE 51

*1-(1,2,5-Thiadiazole-3-carbonyl)-2-(2-p-iodophenylmercaptoethyl)hydrazine*

By replacing the N-benzyl-3-chloropropanamide employed in Example 19 with an equimolar quantity of 2-p-iodophenylmercaptoethyl chloride, and following essentially the same procedure described in Example 19, there is obtained 1-(1,2,5-thiadiazole-3-carbonyl)-2-(2-p-iodophenylmercaptoethyl)hydrazine.

EXAMPLE 52

*1-(1,2,5-Thiadiazole-3-carbonyl)-2-[2-(2,4-dichlorophenylmercapto)-ethyl]hydrazine*

By replacing the N-benzyl-3-chloropropanamide employed in Example 19 with an equimolar quantity of 2-(2,4-dichlorophenylmercapto)ethyl chloride, and following essentially the same procedure described in Example 19, there is obtained 1-(1,2,5-thiadiazole-3-carbonyl)-2-[2-(2,4-dichlorophenylmercapto)ethyl]hydrazine.

EXAMPLE 53

*1-(1,2,5-Thiadiazole-3-carbonyl)-2-[2-(2,4,6-trichlorophenylmercapto)ethyl]-hydrazine*

By replacing the N-benzyl-3-chloropropanamide employed in Example 19 with an equimolar quantity of 2-(2,4,6-trichlorophenylmercapto)ethyl chloride, and following essentially the same procedure described in Example 19, there is obtained 1-(1,2,5-thiadiazole-3-carbonyl) - 2 - [2-(2,4,6-trichlorophenylmercapto)ethyl]hydrazine.

EXAMPLE 54

*1-(1,2,5-Thiadiazole-3-carbonyl)-2-(3-phenylmercaptopropyl)hydrazine*

By replacing the N-benzyl-3-chloropropanamide employed in Example 19 with an equimolar quantity of 3-phenylmercaptopropyl chloride, and following essentially the same procedure described in Example 19, there is obtained 1-(1,2,5-thiadiazole-3-carbonyl)-2-(3-phenylmercaptopropyl)hydrazine.

EXAMPLE 55

*1-(1,2,5-Thiadiazole-3-carbonyl)-2-(4-phenylmercaptobutyl)hydrazine*

By replacing the N-benzyl-3-chloropropanamide employed in Example 19 with an equimolar quantity of 4-phenylmercaptobutyl chloride, and following essentially the same procedure described in Example 19, there is obtained 1-(1,2,5-thiadiazole-3-carbonyl)-2-(4-phenylmercaptobutyl)hydrazine.

EXAMPLE 56

*1-(1,2,5-Thiadiazole-3-carbonyl)-2-(2-propoxyethyl)hydrazine*

By replacing the N-benzyl-3-chloropropanamide employed in Example 19 with an equimolar quantity of 2-propoxyethyl bromide, and following essentially the same procedure described in Example 19, there is obtained 1-(1,2,5 - thiadiazole - 3 - carbonyl)-2-(2-propoxyethyl)hydrazine.

EXAMPLE 57

*1-(1,2,5-Thiadiazole-3-carbonyl)-2-(2-hexyloxyethyl)hydrazine*

By replacing the N-benzyl-3-chloropropanamide employed in Example 19 with an equimolar quantity of 2-hexyloxyethyl bromide, and following essentially the same procedure described in Example 19, there is obtained 1 - (1,2,5 - thiadiazole-3-carbonyl)-2-(2-hexyloxyethyl)hydrazine.

EXAMPLE 58

*1-(1,2,5-Thiadiazole-3-carbonyl)-2-(3-butoxypropyl)hydrazine*

By replacing the N-benzyl-3-chloropropanamide employed in Example 19 with an equimolar quantity of 3-butoxypropyl bromide, and following essentially the same procedure described in Example 19, there is obtained 1 - (1,2,5 - thiadiazole-3-carbonyl)-2-(3-butoxypropyl)hydrazine.

EXAMPLE 59

*1-(1,2,5-Thiadiazole-3-carbonyl)-2-(4-ethoxybutyl)hydrazine*

By replacing the N-benzyl-3-chloropropanamide employed in Example 19 with an equimolar quantity of 4-ethoxybutyl bromide, and following essentially the same procedure described in Example 19, there is obtained 1 - (1,2,5 - thiadiazole-3-carbonyl)-2-(4-ethoxybutyl)hydrazine.

EXAMPLE 60

*1-(1,2,5-Thiadiazole-3-carbonyl)-2-(5-ethoxypentyl)hydrazine*

By replacing the N-benzyl-3-chloropropanamide employed in Example 19 with an equimolar quantity of 5-ethoxypentyl bromide, and following essentially the same procedure described in Example 19, there is obtained 1 - (1,2,5 - thiadiazole-3-carbonyl)-2-(5-ethoxypentyl)hydrazine.

EXAMPLE 61

*1-(1,2,5-Thiadiazole-3-carbonyl)-2-(6-methoxyhexyl)hydrazine*

By replacing the N-benzyl-3-chloropropanamide employed in Example 19 with an equimolar quantity of 6-methoxyhexyl bromide, and following essentially the same procedure described in Example 19, there is obtained 1 - (1,2,5 - thiadiazole - 3 - carbonyl)-2-(6-methoxyhexyl)hydrazine.

EXAMPLE 62

1-(1,2,5-Thiadiazole-3-carbonyl)-2-(2-ethylmercaptoethyl)hydrazine

By replacing the N-benzyl-3-chloropropanamide employed in Example 19 with an equimolar quantity of 2-ethylmercaptoethyl bromide, and following essentially the same procedure described in Example 19, there is obtained 1 - (1,2,5 - thiadiazole-3-carbonyl)-2-(2-ethylmercaptoethyl)hydrazine.

EXAMPLE 63

1-(1,2,5-Thiadiazole-3-carbonyl)-2-(2-butylmercaptoethyl)hydrazine

By replacing the N-benzyl-3-chloropropanamide employed in Example 19 with an equimolar quantity of 2-butylmercaptoethyl bromide, and following essentially the same procedure described in Example 19, there is obtained 1-(1,2,5-thiadiazole-3-carbonyl)-2-(2-butylmercaptoethyl)hyrazine.

EXAMPLE 64

1-(1,2,5-Thiadiazole-3-carbonyl)-2-(3-ethylmercaptopropyl)hydrazine

By replacing the N-benzyl-3-chloropropanamide employed in Example 19 with an equimolar quantity of 3-ethylmercaptopropyl bromide, and following esentially the same procedure described in Example 19, there is obtained 1-(1,2,5-thiadiazole-3-carbonyl)-2-(3-ethylmercaptopropyl)hydrazine.

EXAMPLE 65

1-(1,2,5-Thiadiazole-3-carbonyl)-2-(3-ethylmercaptopropyl)-2-propylhydrazine By replacing the hydrazine and the methyl iodide employed in Example 17 by equivalent quantities of 1-(1,2,5-thiadiazole-3-carbonyl)-2-(3-ethylmercaptopropyl)hydrazine [prepared as described in Example 64] and n-propyl iodide, and following substantially the same procedure described in Example 17, there is obtained 1-(1,2,5-thiadiazole - 3 - carbonyl)-2-(3-ethylmercaptopropyl)-2-propylhydrazine.

EXAMPLE 66

1-(1,2,5-Thiadiazole-3-carbonyl)-2-(2-tert.-butoxyethyl)hydrazine

By replacing the N-benzyl-3-chloropropanamide employed in Example 19 with an equimolar quantity of 2-tert.-butoxyethyl bromide, and following essentially the same procedure described in Example 19, there is obtained 1-(1,2,5-thiadiazole-3-carbonyl)-2-(2-tert.-butoxyethyl)hydrazine.

EXAMPLE 67

1-(1,2,5-Thiadiazole-3-carbonyl)-2-(2-benzylmercaptoethyl)hydrazine

By replacing the N-benzyl-3-chloropropanamide employed in Example 19 with an equimolar quantity of 2-benzylmercaptoethyl bromide, and following substantially the same procedure described in Example 19, there is obtained 1 - (1,2,5-thiadiazole-3-carbonyl)-2-(2-benzylmercaptoethyl)hydrazine.

EXAMPLE 68

1-(1,2,5-Thiadiazole-3-carbonyl)-2-[2-(N-benzylcarbamoyl)-ethyl]hydrazine (1,2,5-thiadiazole-3-carbonyl)hydrazine (43.2 g., 0.3 mole) is aded to a mixture of tert.-butyl alcohol (300 ml.) and glacial acetic acid (7.5 ml.) in a 4-necked flask equipped with a mechanical stirrer, reflux condenser, dropping funnel and thermometer. The stirrer is started and the slurry heated to 40° C. in an electric heating mantle. While maintaining the temperature at 40–42° C., methyl acrylate (36.2 g., 0.42 mole) is added dropwise over 45 minutes. The mixture is then stirred and refluxed for 18 hours. The solution then is concentrated in vacuo and 1 - (1,2,5 - thiadiazole-3-carbonyl) - 2 - (2-methoxycarbonylethyl)hydrazine isolated from the residue. A mixture of the thus obtained 1-(1,2,5-thiadiazole-3-carbonyl)-2-(2-methoxycarbonylethyl)hydrazine (25.3 g., 0.11 mole) and benzylamine (16.1 g., 0.15 mole) is placed in 250 ml. flask and stirred and heated at 130–132° C. for three hours. After cooling, the product that separates is recrystallized from benzene. The purified material, 1 - (1,2,5-thiadiazole-3-carbonyl)-2-[2-(N-benzylcarbamoyl)ethyl]hydrazine, melts at 117–118.5° C.

The compounds of this invention are effective monoamine oxidase inhibitors. Because of this property they effect the metabolism of serotonin, epinephrine, norepinephrine, and other amines and, therefore, are useful therapeutic agents in human and veterinary practice especially to stimulate physical and mental activity. Because of this latter property, the compounds of this invention can be used as psychic energizers in the treatment of depressed or regressed psychotics. In addition, compounds possessing these properties are useful in the treatment of hypertension, they provide relief of anginal symptoms in some patients and additionally, they inhibit bowel motility.

In particular, the compounds 1-(1,2,5-thiadiazole-3-carbonyl)-2-benzylhydrazine and 1-(1,2,5-thiadiazole-3-carbonyl) - 2-[2-(N-benzylcarbamoyl) - ethyl]hydrazine were found to be considerably more effective than iproniazide (1-isonicotinyl-2-isopropylhydrazine) in increasing the concentration of serotonin in the mouse brain, and markedly more effective than iproniazide in in vitro inhibition of monoamine oxidase, two tests conventionally used to evaluate the potential of a compound as a psychic energizer.

The dosage of the compounds, however, will vary over a wide range and for this reason capsules, tablets, and other dosage forms suitable for oral or parenteral administration containing from about 1 mg. to about 100 mg. or more of the active ingredient per unit dose can be made available to the physician or the veterinarian for the symptomatic adjustment of the dosage on a 1 to 4 times a day regimen. As the compounds have a high therapeutic index the quanttiy administered to produce the desired response presents no serious problem. Acute toxicity studies in mice using 1-(1,2,5-thiadiazole-3-carbonyl)-2-benzylhydrazine gives an $LD_{50}$ of about 320 mg./kg. when administered orally and about 245 mg./kg. administered intraperitoneally, and the $LD_{50}$ of 1-(1,2,5-thiadiazole - 3 - carbonyl) - 2-[2 - (N-benzylcarbamoyl)-ethyl]-hydrazine is about 280 mg./kg. orally and about 390 mg./kg. intraperitoneally.

As each of the compounds of this invention can be incorporated in a dosage form similar to that described in the following example or in other dosage forms suitable for oral or parenteral administration, which can be prepared by methods known to pharmacists, only one example is included herein to illustrate the preparation of a representative dosage form.

EXAMPLE 69

Dry-Filled Capsules Containing 25 mg. of Active Ingredients per Capsule

Per Capsule, mg.

1-(1,2,5-Thiadiazole-3-carbonyl)-2-benzylhydrazine _____ 25
Lactose capsule size No. 2 _____ 250

The 1-(1,2,5-thiadiazole-3-carbonyl)-2-benzyl-hydrazine is reduced to a No. 60 powder. The lactose then is passed through a No. 60 bolting cloth onto the powder, the combined ingredients are mixed for 10 minutes, and then filled into No. 2 dry gelatin capsules.

While the above examples describe the preparation of

What is claimed is:

1. A compound selected from the group consisting of 1-(1,2,5-thiadiazole-3-carbonyl) - 2 - $R^1$ - 2 - $R^2$ - hydrazine and salts thereof wherein $R^1$ is selected from the group consisting of lower alkyl,
cycloalkyl having 3 to 6 carbons in the nuclear structure,
N-lower alkylpiperidyl,
N-piperidyl-lower alkyl,
N-lower alkylpyrrolidyl,
phenyl-lower alkylcarbamoyl-lower alkyl,
phenylcarbamoyl-lower alkyl,
di-lower alkylamino-lower alkyl,
lower-(alkoxyalkyl),
lower alkylmercapto-lower alkyl,
phenoxy-lower alkyl,
phenylmercapto-lower alkyl,
phenyl-lower-(alkoxyalkyl),
phenyl-lower alkylmercapto-lower alkyl,
phenyl-lower alkyl and
phenylcycloalkyl having 3 to 6 carbons in the cycloalkyl moiety;

and $R^2$ is selected from the group consisting of hydrogen, lower alkyl and benzyl.

2. 1-(1,2,5-thiadiazole-3-carbonyl) - 2 - (phenyl lower alkyl)hydrazine.

3. 1-(1,2,5-Thiadiazole - 3 - carbonyl) - 2 - benzylhydrazine.

4. 1-(1,2,5-Thiadiazole-3-carbonyl) - 2 - phenethylhydrazine.

5. 1-(1,2,5-Thiadiazole - 3 - carbonyl) - 2 - (1-methyl-2-phenylethyl)hydrazine.

6. 1-(1,2,5-Thiadiazole - 3 - carbonyl) - 2 - (α-methylbenzyl)hydrazine.

7. 1-(1,2,5-thiadiazole - 3 - carbonyl) - 2 - (halophenyl-lower alkyl)hydrazine.

8. 1-(1,2,5-thiadiazole - 3 - carbonyl) - 2 - (phenyl-lower alkyl) - 2 - lower alkylhydrazine.

9. 1-(1,2,5-Thiadiazole - 3 - carbonyl) - 2 - (2-phenyl-1-cyclopropyl)hydrazine.

10. 1-(1,2,5-Thiadiazole - 3 - carbonyl) - 2 - [2-(N-benzyl-carbamoyl)-ethyl]hydrazine.

11. A process wherein 1-(1,2,5-thiadiazole-3-carbonyl)-2-$R^1$-hydrazine is reacted with a compound selected from the group consisting of an alkylating agent and an aralkylating agent to give 1-(1,2,5-thiadiazole-3-carbonyl)-2-$R^1$-2-Y-hydrazine, wherein, in each of the above formulae, $R^1$ has the meaning assigned to it in claim 1; and Y is selected from the group consisting of lower alkyl and benzyl.

12. A process wherein (1,2,5-thiadiazole-3-carbonyl)hydrazine is reacted with a compound selected from the group consisting of an alkylating agent and an aralkylating agent to give 1-(1,2,5-thiadiazole-3-carbonyl)-2-H-2-Y-hydrazine, 1-(1,2,5-thiadiazole-3-carbonyl) - 2 - Y-2-Y-hydrazine, and mixtures thereof wherein, in each of the above formulae Y is selected from the group consisting of lower alkyl and benzyl.

References Cited in the file of this patent

Khaletskii et al.: Chem. Absts., vol. 52, columns 4605–6 (1958).